R. G. MOORE.
STAFF LATHE.
APPLICATION FILED MAR. 8, 1920.
1,379,645.
Patented May 31, 1921.
4 SHEETS—SHEET 1.
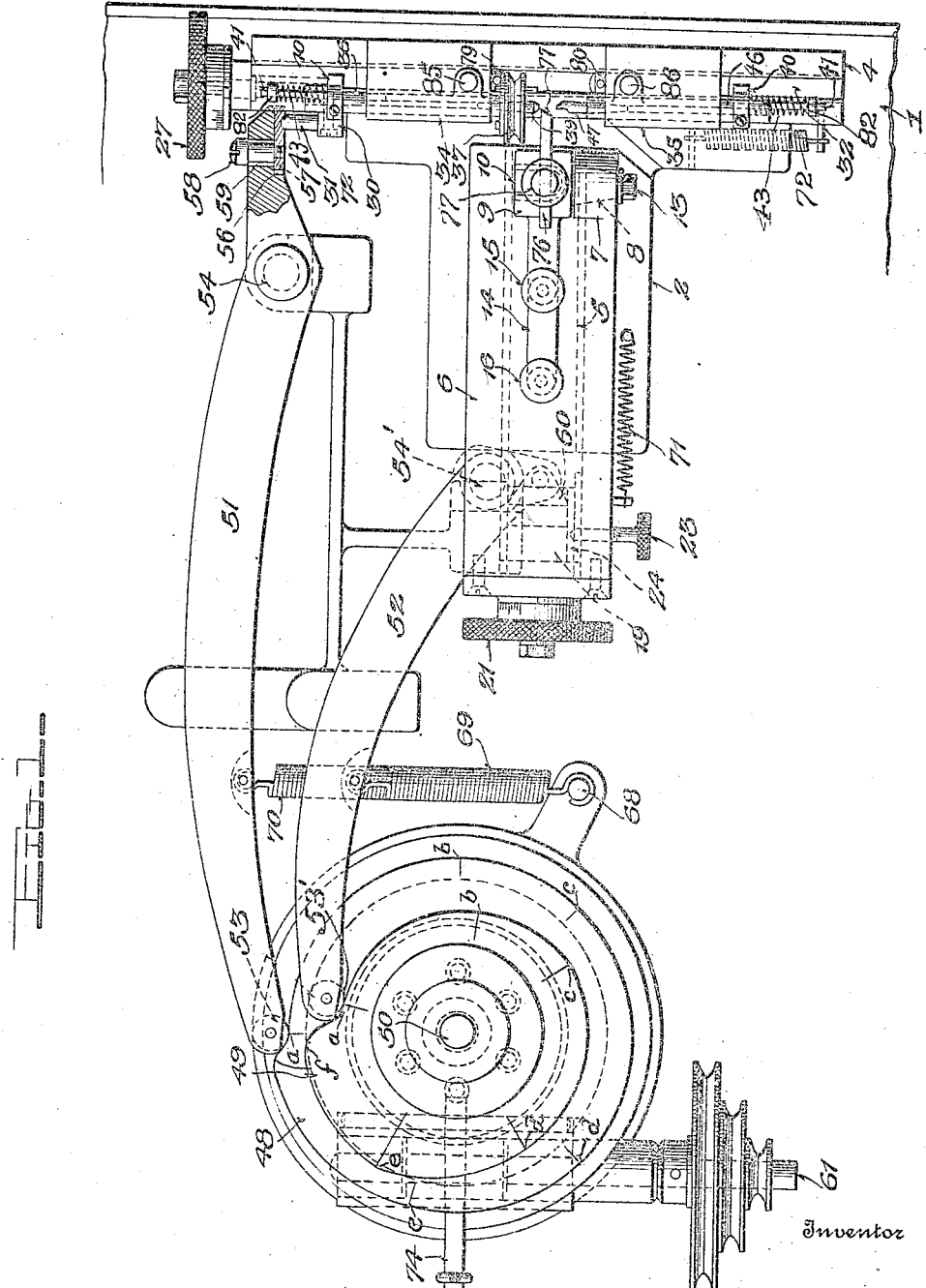
Inventor
Raymond G. Moore
By 
Attorney

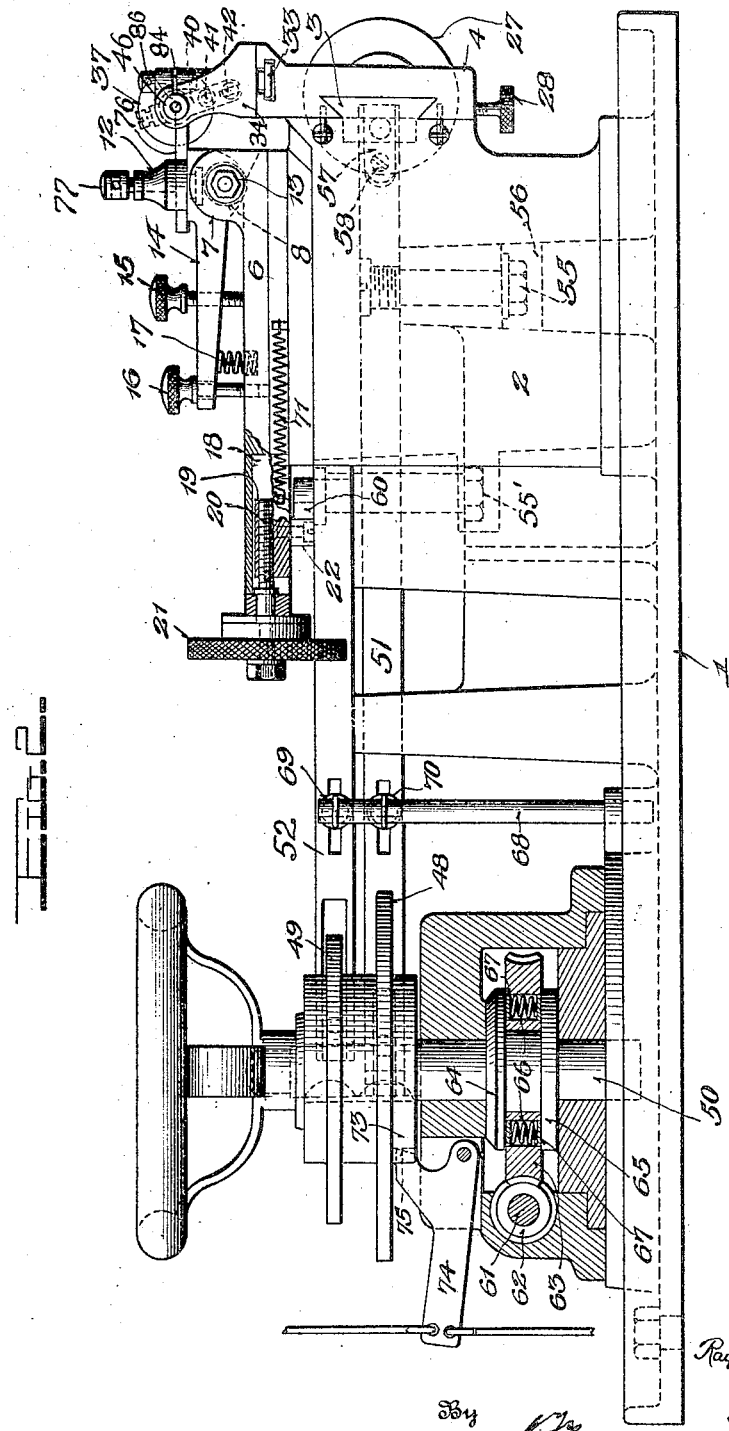

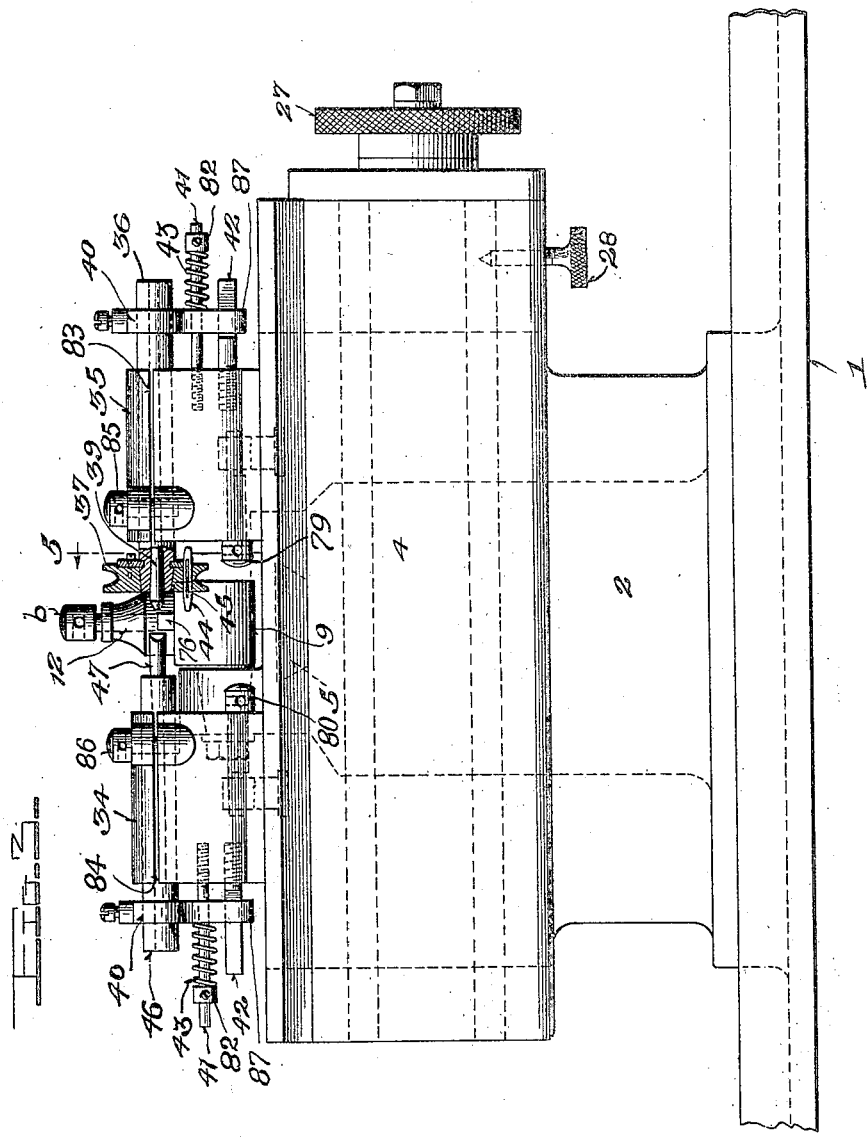

R. G. MOORE.
STAFF LATHE.
APPLICATION FILED MAR. 8, 1920.
1,379,645.
Patented May 31, 1921.
4 SHEETS—SHEET 4.
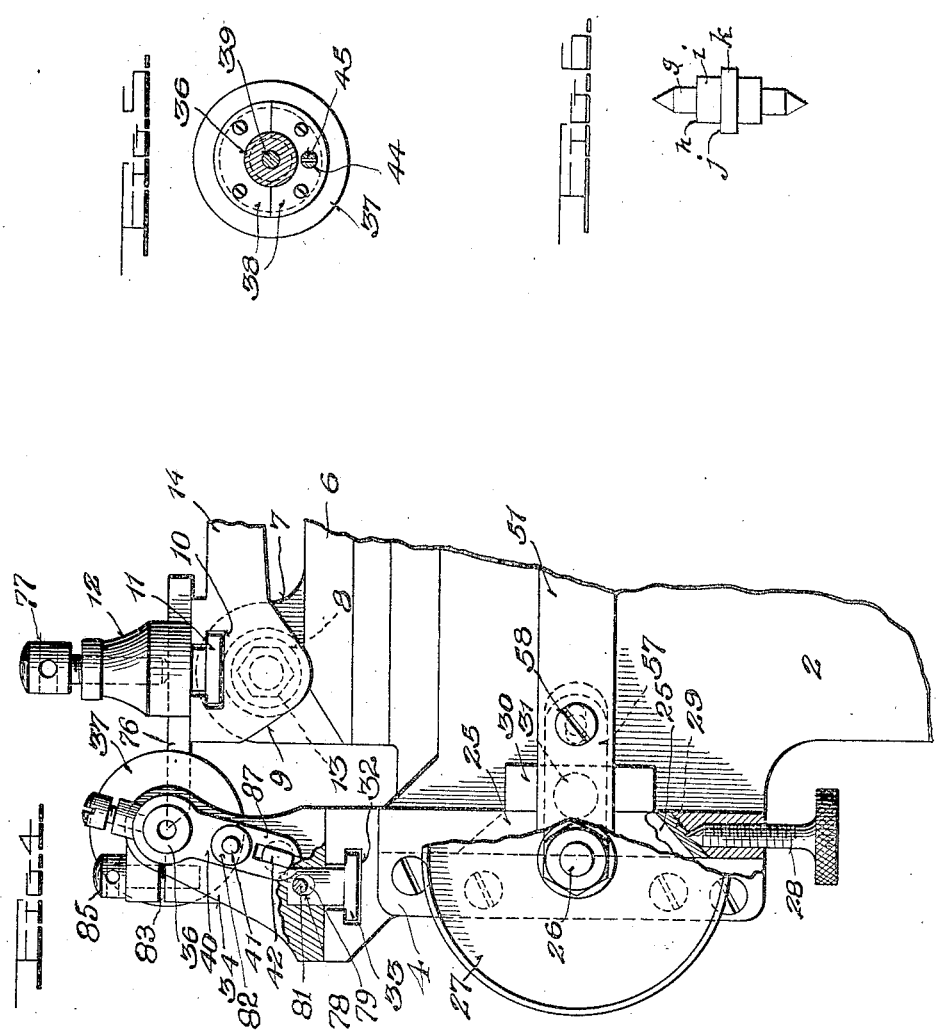
Inventor
Raymond G. Moore
By
Attorney

UNITED STATES PATENT OFFICE.

RAYMOND G. MOORE, OF UTICA, NEW YORK, ASSIGNOR TO THE BASSICK COMPANY, OF BRIDGEPORT, CONNECTICUT, A CORPORATION OF CONNECTICUT.

STAFF-LATHE.

1,379,645.　　　　Specification of Letters Patent.　　Patented May 31, 1921.

Application filed March 8, 1920. Serial No. 364,233.

*To all whom it may concern:*

Be it known that I, RAYMOND G. MOORE, a citizen of the United States, residing at the city of Utica, county of Oneida, and State of New York, have invented certain new and useful Improvements in Staff-Lathes; and I do declare the following to be a full, clear, and exact description of the invention, such as will enable others skilled in the art to which it appertains to make and use the same.

This invention relates to certain new and useful improvements in a staff lathe and more particularly to a machine for turning small staffs, pinions, arbors, and the like, where there are a number of different lengths of varying diameters to be produced. Formerly it was the practice, where a watch or clock staff was to be turned, to turn one portion or length of the staff to a given diameter. The staff was then removed from the machine, the latter readjusted or set for turning another length having a different diameter, reinserting the staff in the machine and performing the turning operation, again removing the work from the mechanism and continuing this cycle of operations as many times as there were different sections or lengths to be cut. This proved to be an exceedingly tedious and expensive practice and required many readjustments of the machine during the turning of a single pinion or staff.

In order to overcome the above noted disadvantages lathes have been constructed in which the cutting tool was capable of sliding movements at right angles to each other, and such tool operated upon the work which was held between the lathe centers absolutely stationary as against any lengthwise movements, but a structure of this sort, while exceedingly efficient concentrated considerable work and mechanism in direct association with the carriage of the cutting tool.

It is the principal object of the present invention to provide for only one sliding movement of the cutting tool, so that the latter may be positioned for the purpose of cutting varied diameters, while the extent of the cutting is effected solely by shifting or sliding the work itself, thus greatly simplifying the machine and increasing its capacity.

The invention further resides in the provision of a tool carrying slide and a work carrying slide each independently operable, and so mounted that one will not in any way interfere with the other. In fact, each slide is operated by independent mechanisms.

Further, the invention resides in the arrangements and combinations of parts, and the features of construction described in detail in the following specification and briefly defined in the appended claims, reference being had to the accompanying drawings, wherein—

Figure 1 is a top plan view of the improved mechanism embodying the present invention;

Fig. 2 is a side elevation thereof with a portion of the drive mechanism depicted in section;

Fig. 3 is a front elevation of the improved staff;

Fig. 4 is a fragmentary view showing the opposite side of the lathe from that depicted in Fig. 2;

Fig. 5 is a detailed section on line 5—5 of Fig. 3, and

Fig. 6 is a view showing the kind of staffs turned from a lathe constructed in accordance with the present invention.

Referring more in detail to the drawings, the numeral 1 designates the bed of the lathe on which is mounted the slide support or frame 2 here depicted as T-shaped in plan. Across its front face the frame is provided with a dove tailed rib 3 secured thereto in any suitable manner on which is slidably mounted the work supporting slide 4, this slide being therefore capable of movements in a horizontal plane across the front of the frame.

On top of the frame 2, lengthwise of the same or at right angles to the rib 3, is a similar rib 5 secured to the frame in any suitable manner, which provides a guide and support for the independently movable tool carrying slide 6.

This tool carrying slide has rising from its front end a laterally offset bearing 7 in which is journaled a cone shaft 8 which extends at right angles to the length of the slide 6 and has rigid therewith a rockable support 9 which has an open undercut gate 10 in its upper edge in which the depending head 11 of the tool holding post 12 is adjustable. The tool itself, which is denoted by the numeral 76, passes freely through an opening in the post 12, and a set screw 77 is driven through the top of this post against the tool so as to not only hold the tool in its normal adjustment, but also to bind the tool firmly against the top edge of the support 9, so that when once adjusted the head 11 cannot be accidentally shifted within the gate 10.

It is very necessary to have these two normal adjustments of the cutting tool, one to set the cutting edge of the tool the proper distance forward toward the work, and the other to determine the normal vertical plane of the tool with respect to the work, and both these adjustments are fixed by this set screw 77 above noted. A nut 13 is threaded on the projecting end of the cone shaft or trunnion 8 so as to preserve a nice fit between this shaft and its bearing.

Forming a part of the support 9 and extending from the same lengthwise of the slide 6 is a lever 14, and threaded through this lever is a set screw 15 that bears on the slide 6 and coöperates with the limit screw 16 loosely passed through this lever and threaded into the slide. By means of these two screws the lever 14 is tilted so as to determine the desired angular disposition of the cutting tool with respect to the work. A coiled spring 17 is also interposed between the lever extension and the slide, obviously to hold the former up against the head of the limit screw.

At the outer end of the slide 6 a recess 18 is cut, and in this recess is housed a block 19 capable of being shifted lengthwise of the slide 6, and secured to the end of this slide so as to be stationary as to any lengthwise movement is a screw 20 which is driven within the block 19 and is provided with a graduated hand wheel 21 by the operation of which the block may be shifted to any predetermined degree. A lug block 22 is secured to the bottom face of the block 19 and projects beyond the under face of the slide 6 in that particular location. A set screw 23 is threaded through the side of the slide 6 and takes within an interposed shoe 24, so as to be capable of impinging the latter against the adjacent side of the block 19 and firmly binding the same in its adjusted position.

The work holding slide 4 at one end contains a block 25 capable of shifting movements lengthwise of said slide, and a screw 26 is passed through the end of the slide 4, so as to be capable of any independent lengthwise movement and is threaded within this block 25, this screw being provided with a graduated hand wheel 27 whereby the screw may be operated to shift the block 25 to any desired adjustment. 28 is a set screw which is driven through the slide 4 and engages against a suitable shoe 29 whereby the latter may be impinged against the block 25 to secure the latter in any desired adjustment.

Secured to the block 25 in any suitable manner is a lug 30 which extends beyond the plane of the slide 4, and secured to this lug and extending outwardly therefrom and parallel with the block 25 is a pin 31 whose free extremity is convexed.

The work holding slide 4 has a lengthwise groove 32 in its upper edge, and in this groove are adapted to slide the headed projections or studs 33, 33', associated with the head stock 34 and the tail stock 35. Each of these studs are constructed and operated in precisely the same manner, and a description of one will be sufficient.

Referring more particularly to Fig. 4 in which the stud 33 is shown on a somewhat enlarged scale, this stud extends upwardly and loosely within a socket in the bottom of the tail stock 34, and the stud is pierced so as to provide a comparatively large circular opening 78. 79, 80, are pins that extend freely through the inner faces of these stocks 34 and 35 and terminate in eccentric portions that extend within the openings in the studs. In the instance of the stud 33 the pin 79 has an eccentric portion 81 that extends within the opening 78, and after the head stock 34 has been shifted to a proper adjustment the pin 79 is turned so as to cause the eccentric portion 81 to impinge against the upper portion of the opening 78, and thereby force the head of the stud 33 firmly against the undercut of the groove 32 and thus hold the tail stock in this position. A slight relaxing of the pin 79 will release the stock and enable it to be further adjusted.

Within the head stock 34 and tail stock 35 are arbors 36 and 46 which are non-rotatable but are capable of lengthwise movements, and on the arbor 36 a whirl pulley 37 is freely journaled, preferably by means of a split collar 38 which fits in a peripheral channel in the arbor and is secured to the side of the pulley. In the inner ends of the arbors 36 and 46 are secured center pins 39 and 47, and fixed on the outer ends of each arbor are laterally extending arms 40 which slidingly embrace the stems 41 that project from the outer side edges of the parts 34 and 35. These stems have suitable heads 82 fixed to their outer ends and are surrounded by coil springs 43 that are confined between these heads and the parts 34 and 35, so that it will be clear that the arbors 36 and 46 when free to slide will always be thrust inwardly with a resilient action.

The head and tail stocks 34, 35, are split along their top front edges as shown at 83, 84, and screws 85, 86, are driven through upper and lower portions of these splits so as to bind the arbors firmly to these stocks in order to prevent any independent sliding movements of said arbors.

One of these screws 85, 86, is always in a relaxed condition, so that its respective arbor is always rendered resilient by reason of the spring 43, and therefore the work will always be resiliently held between the centers, and in removing work it is merely necessary to thrust against the resiliently yielding center.

Sometimes one center is made resilient in this manner and sometimes the other, according to the demands of the occasion.

The pulley 37 has a transverse bore in which is frictionally mounted a pin 44 which has a lengthwise slot 45 therein to increase its resilient frictional grip, the function of this pin being to engage a dog carried by the work for causing the latter to revolve.

The arms 40 have forked terminals 87 which slidingly embrace flattened stems 42 that project from the outer edges of the parts 34 and 35, the object of this being to steady the arbors and consequently the center pins.

In operation, the staff, arbor or other piece of work is supported by the head and tail stock centers which move in unison with their supporting slide while the cutting tool is turning down one section of the varied diameter work. At the completion of this operation the tool slide is withdrawn to permit the tool to act upon a differently diametered section which takes place upon a succeeding movement of the work slide.

This predetermined actuation of the slides is controlled by a pair of cams 48 and 49 which are keyed to a shaft 50 and respectively operate the levers 51 and 52. These levers carry anti-friction rollers 53, 53', and are fulcrumed by pivot bolts 54, 54', which are threaded through the levers and slidably fitted in vertical bores through the bed and secured by nuts 55, 55'. The front end of the work lever 51 is recessed as at 56 and in this recess is seated a bearing block 57 which is slidably guided by a headed pin 58, passing through an elongated slot 59 in the lever, and is formed with a concave seat to receive the rounded end of the bearing lug 31. Oscillation of the lever 51 will cause the work slide 4 to move, the bearing block 57 sliding back and forth in its seat to accommodate the angular relations assumed with respect to the bearing lug 31. On the free end of lever 52 is pivoted a bearing shoe 60 designed to abut the bearing lug 22 and thereby effect movement of the tool slide or carriage.

The drive for the controlling cams is derived through the shaft 61 and the worm gears 62 and 63, gear 63 being loosely mounted on the cam shaft 50 between a flange 64 and a lock nut 65. The gear 63 is provided with a series of cross chambers or bores in which are housed coiled expansion springs 66 bearing outwardly on disk shoes 67 to provide a friction drive between the gear and the inclosing flange and nut. A post 68 rises from the bed of the machine and constitutes an anchor for the two coiled springs 69 and 70 that are connected to the levers 51 and 52, respectively, which springs hold the rolls 53 and 53' against their respective cams. A spring 71 anchored at one end to the frame 2 and at the opposite end to the slide 6 affords means for returning the slide, when permitted by the lever 52.

A similar spring 72 whose extremities are connected respectively to the frame 2 and slide 4 serves to return the latter, when permitted by the lever 51.

A stop hub 73, fixed on the cam shaft, permits the same to make one revolution when it is arrested by a stop lever 74 dropping into a notch 75 in the hub and arresting the cams against further movement. A treadle, not shown, may be connected to this stop lever for disengaging the same.

The operation of my improvement, with special reference to the cams, as laid out at Fig. 1 is as follows:—

The large cam 48, between the points $a$ and $b$ is eccentric, between the points $b$ and $c$ is concentric, between the points $c$ and $d$ is eccentric, between the points $d$ and $e$ is concentric, and between the points $e$ and $f$ is eccentric, the small cam 49 between the points $a$ and $b$ is concentric, between the points $b$ and $c$ is eccentric, between the points $c$ and $d$ concentric, between the points $d$ and $e$ eccentric, and between the points $e$ and $f$ concentric.

It will therefore be clear that when one of the levers 51, 52, is being actuated by its cam the other lever will be stationary, since there will always be a dwell portion of one cam opposite the eccentric portion of the other cam.

Referring in this connection, also to Fig. 6 of the drawing, during the travel of the respective friction rolls 53, 53', the portion $g$ will be cut, and when these rolls travel from $b$ to $c$ the shoulder $h$ will be formed, when said rollers travel from $c$ to $d$ the portion $i$ will be cut, when the rollers travel from $d$ to $e$, the shoulder $j$ will be cut, and when the rollers travel from $e$ to $f$ the portion $k$ will be cut.

If it is desired to redress the work either different cams may be substituted, which will cause the cutting tool to take a shallow chip from the parts already cut, or else the cams originally may be laid out so that throughout 180° of the same the parts $g$, $h$, $i$, $j$, $k$, will be cut as above indicated, while throughout the remaining 180° of these cams the cutting tool will be operated so as to cut a slight chip from these portions of the work.

What is claimed is:

1. A staff lathe comprising a support, a slide movable thereon, a second slide movable at an angle thereto and independently thereof, work holding means on one slide, tool holding means on the other slide, and means for automatically operating said slides with the tool holding means in position to hold the tool in operative contact with the work during the sliding movement of the work holding means.

2. A staff lathe comprising a support, a slide movable thereon, a second slide movable at an angle thereto and independently thereof, work holding means on one slide, tool holding means on the other, and cam-controlled means for moving each slide arranged to actuate one slide during a rest period of the other slide with the tool holding means in position to hold the tool in operative contact with the work during the sliding movement of the work holding means.

3. A staff-lathe comprising a frame having a rib along its front and a second rib on its top arranged at an angle to the first rib, slides arranged on the ribs to operate independently of one another, work holding means on one slide, tool holding means on the other, and means for automatically and alternately actuating the slides with the tool holding means in position to hold the tool in operative contact with the work during the sliding movement of the work holding means.

4. A staff lathe comprising a frame, a work-holding slide movable thereon, head and tail stocks adjustably mounted on the slide to move therewith, and means for moving the slide.

5. A staff lathe comprising a frame, a work-holding slide movable thereon, head and tail stocks adjustably mounted on the slide to move therewith, a bearing lug adjustable on the slide, and means engaging the lug to effect shifting of the slide.

6. A staff lathe comprising a frame, a work-holding slide movable thereon, head and tail stocks adjustably mounted on the slide to move therewith, a bearing lug adjustable on the slide, and means engaging the lug to effect shifting of the slide, said means including a cam and a lever operable by the cam and bearing on the lug.

7. In a staff lathe, head and tail stocks, spindles for supporting the work thereon, a whirl pulley fixed on one spindle, and an adjustably mounted dog-engaging pin extending transversely and eccentrically through the pulley.

8. In a staff lathe, a frame, independently movable slides thereon, one of said slides having a recess in one face, a block adjustable in the recess, means for effecting adjustment of the block, a bearing lug extending from the block, and means for engaging the lug to move the slide.

In testimony whereof I affix my signature.

RAYMOND G. MOORE.